United States Patent [19]

Albertson

[11] 3,724,579
[45] Apr. 3, 1973

[54] SAFETY DEVICE FOR ALL TERRAIN VEHICLE
[76] Inventor: Robert V. Albertson, 2100 Shady Wood Road, Minneapolis, Minn.
[22] Filed: Nov. 5, 1970
[21] Appl. No.: 87,109

[52] U.S. Cl. .............................. 180/5 R, 280/150 R
[51] Int. Cl. ............................................. B62m 27/02
[58] Field of Search......... 280/150 R, 150 C; 180/5 R

[56] References Cited

UNITED STATES PATENTS 1,122,742  12/1914  Halbach........................... 280/150 R
1,107,832  8/1914   Palis ............................... 280/150 R

OTHER PUBLICATIONS

Saftgard, "Snowmobile Windshield and Barb Wire Protector" Advertising Brochure of Rolco Inc., Lencenter, Minnesota Published and Distributed Nov. 18, 1969.

Primary Examiner—Benjamin Hersh
Assistant Examiner—Robert R. Song
Attorney—Alfred E. Hall

[57] ABSTRACT

A safety device for an all terrain vehicle, such as a snowmobile, which protects the vehicle and its operator from injury which may occur when the vehicle strikes an obstacle such as fence wire, low branches or the like. The device comprises a hook-shaped member secured to the upper edge of the windscreen with the hook opening pointing toward the front of the vehicle. A cable is fastened to the shank of the hook and passes through the hood of the vehicle at a point forward of the windscreen and is secured to the frame of the vehicle.

3 Claims, 2 Drawing Figures

PATENTED APR 3 1973 3,724,579

INVENTOR
ROBERT V. ALBERTSON

BY Alfred E Hall
ATTORNEY

SAFETY DEVICE FOR ALL TERRAIN VEHICLE

BACKGROUND OF THE INVENTION

Snowmobile operators have been seriously injured when the vehicles in which they were riding hit low branches, fence wires and the like. These obstructions tend to damage the windscreen or ride up the slanted windscreen until they clear the top thereof at which time they strike the operator in the head or neck, sometimes with fatal results.

The present invention is a safety device which protects the windscreen and the driver of an all terrain vehicle from damage or injury which would otherwise occur when the vehicle strikes fence wires and the like. As used herein, the term "all terrain vehicle" is intended to include all types of motorized vehicles designed to travel across rough fields as well as along roadways. A snowmobile is a typical member of the class.

In its simplest form, the safety device of this invention comprises a hook-shaped member having a length of twisted wire cable fastened to the shank thereof. In operation, the hook member is secured to the upper edge of the windscreen and the cable extends downward and slightly forward of the windscreen, through the vehicle's hood and is securely fastened to the frame of the vehicle. The inside radius of the hook is formed into a wedge so as to provide a sharp cutting surface. Thus, when the vehicle incorporating the invention strikes a low branch or wire, the obstacle rides up the cable and is engaged by the hook. The cutting edge of the hook may then sever the wire, permitting the vehicle to pass therethrough without damage to either the vehicle or its operator. If the speed of the vehicle or the size of the wire or obstruction is such that the force of impact is insufficient to sever the obstruction, the hook and cable assembly will still prevent the obstruction from striking the operator.

It is accordingly an object of this invention to provide a safety device for all terrain vehicles.

Another object of this invention is to provide an accessory for an all terrain vehicle which when used, will protect the vehicle and its operator from injury which might otherwise result from striking a fence wire at high speeds.

Still another object of this invention is to provide a safety device for an all terrain vehicle which is inexpensive and easy to install.

These and other objects of the invention will become apparent to those of ordinary skill in the art upon reading the following detailed description in light of the accompanying drawing which:

FIG. 1 illustrates a preferred embodiment of the invention as applied to a snowmobile; and FIG. 2 is a view showing the cross-section of a portion of the hook.

DETAILED DESCRIPTION

Figure 1:
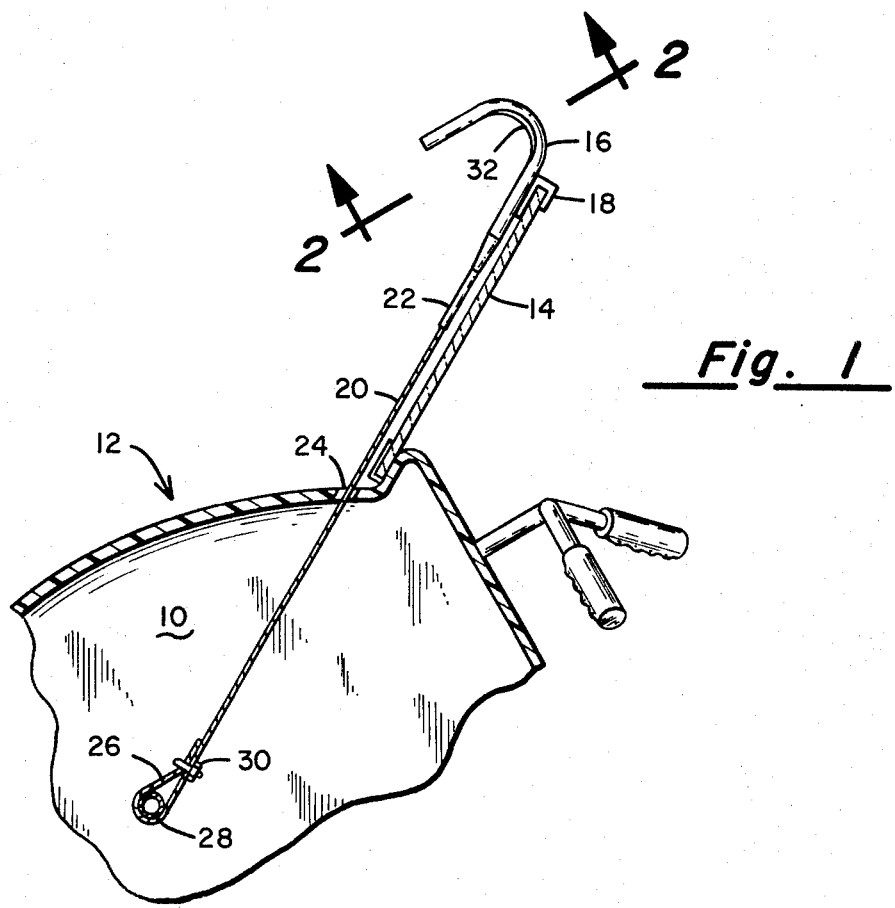

Referring now to FIG. 1, there is shown a portion of a snowmobile type all terrain vehicle indicated generally by numeral 10. The vehicle has a hood 12 which covers the steering mechanism (not shown). Projecting upward from the hood 12 is a windscreen 14 which may be formed from safety glass or plexiglass.

The present invention comprises a hook-shaped member 16 which is fastened to a U-shaped channel 18 by welding or otherwise. The U-shaped channel is dimensioned to fit snugly over the top edge of the windscreen 14 and when in this position, the open side of hook member 16 is pointed toward the front of the vehicle.

A twisted wire cable 10 is securely fastened to the shank 22 of hook 16 and passes through a hole 24 in the hood 12. The end 26 of cable 20 is secured to a portion 28 of the vehicle's frame and the tension is adjusted by means of the cable clamp 30. The tension is such that a substantial force must be applied to the cable 20 in a horizontal direction before the cable will come into contact with the windscreen 14. Because the plane of windscreen 14 and the cable 20 are approximately parallel, the force applied to the windscreen the U-shaped channel 18 is principally compressive and, as such, the windscreen is able to withstand relatively high forces in this direction.

Figure 2:
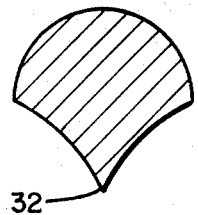

As can best be seen from FIG. 2 which illustrates the cross-section of the hook 16 along the line 2—2 in FIG. 1, the inside radius of the hook is tapered to a wedge 32. This wedge comprises a cutting surface as will be further described hereinbelow.

In operation, if while driving the vehicle across fields or through woods, the vehicle should strike a branch or fence wire, the obstruction will come into contact with the cable 20 rather than striking the windscreen. Because of the slant of the cable with respect to the vertical, the obstruction will tend to ride up along the cable and will be engaged by the hook 16. This prevents the obstruction from clearing the windscreen and snapping into the face or neck of the operator. The wire or obstruction rides along the wedge portion 32 or hook 16 and may be cut thereby to permit the vehicle to continue along its way. If the size of the fence wire or obstruction is such that it does not break upon impact, the vehicle comes suddenly to a halt, but the hook and cable assembly of this invention continues to protect the operator from injury which would otherwise result from striking the obstruction.

Thus it can be seen that this invention provides a low cost safety device which can be installed in minutes to almost all types of all terrain vehicles to protect an operator's neck, face and eyes from loose wire and hard to see fences. The design is such that it does not obstruct the operator's vision.

While there has been shown and illustrated a preferred embodiment of the invention, other changes and modifications may become apparent to those of ordinary skill in the art and accordingly, the scope of the invention is to be determined from the following claims.

What is claimed is:

1. In combination with a powered all terrain vehicle of the type having a windscreen and a hood:
    a. a cable having one end thereof extending through the hood and secured to the frame of said vehicle,
    b. a hook member attached to the other end of said cable, said hook being provided with a sharp edge on the inside radius thereof for cutting obstacles which come into engagement therewith; and
    c. means for securing said hook member to said windscreen such that said hook extends toward the front of said vehicle.

2. A device adapted to be secured to the windscreen of an all terrain vehicle for preventing damage to said windscreen when said vehicle encounters fence wires or the like comprising:
- a. a hook member having an inner radius provided with a cutting edge and having clamping means secured thereto for clamping said hook member to the upper edge of the windscreen of a vehicle such that said hook opens toward the front of said vehicle, and
- b. a cable fastened at one end to the shank of said hook and the other end extending through the vehicle hood and adapted to be secured to the frame of said vehicle at a point forward of and below said windscreen such that when said vehicle strikes a fence wire, the wire rides up said cable and into said hook.

3. Apparatus as in claim 2 wherein said clamping means comprises a U-shaped channel having one leg thereof fastened to the shank of said hook, said channel adapted to engage the upper edge of said windscreen.

* * * * *